United States Patent [19]

Larsson

[11] Patent Number: 5,989,492
[45] Date of Patent: Nov. 23, 1999

[54] PROCESS INCLUDING HEATING AND COOLING FOR PRODUCTION OF AN INJECTION-MOULDED BODY

[75] Inventor: Owe Larsson, Höganäs, Sweden

[73] Assignee: AGA Aktiebolag, Lidingo, Sweden

[21] Appl. No.: 08/860,834

[22] PCT Filed: Nov. 30, 1995

[86] PCT No.: PCT/SE95/01434

§ 371 Date: May 14, 1998

§ 102(e) Date: May 14, 1998

[87] PCT Pub. No.: WO96/19308

PCT Pub. Date: Jun. 27, 1996

[30] Foreign Application Priority Data

Dec. 19, 1994 [SE] Sweden .................................. 9404418
May 18, 1995 [SE] Sweden .................................. 9501843

[51] Int. Cl.[6] .................................................. C04B 35/64
[52] U.S. Cl. .......................... 419/36; 264/638; 264/645; 264/651; 264/669; 264/670; 264/328.2; 264/344; 264/345; 264/348; 419/37; 419/38; 419/39; 419/41; 419/66; 419/67
[58] Field of Search ................................. 264/645, 328.2, 264/638, 651, 670, 669, 344, 345, 348; 419/36, 37, 38, 39, 66, 41, 67

[56] References Cited

U.S. PATENT DOCUMENTS 4,113,480  9/1978  Rivers ........................................ 419/36
4,320,080  3/1982  Esper ....................................... 264/111
4,455,353  6/1984  Bruce ........................................ 419/25
4,908,172  3/1990  Sterzel et al. ......................... 264/328.2

FOREIGN PATENT DOCUMENTS

0004272  10/1979  European Pat. Off. .
454247  4/1988  Sweden .
8102126  8/1981  WIPO .

*Primary Examiner*—James Derrington
*Attorney, Agent, or Firm*—Pearne, Gordon, McCoy & Granger LLP

[57] ABSTRACT

A process for production of a moulded ceramic and/or metallic body from a ductile material comprising one or more ceramic and/or metallic components, which material is fed into the pre-heated mould cavity (1) of a moulding tool. The moulded tool includes at least two mould parts (4, 5) of which at least one wholly or partly consists of a microporous material with communicating micropores. At least one mould cavity (1) comprising at least one mould surface (2, 3) exhibiting closed micropores is arranged in the microporous mould part (4, 5) or in a microporous section (6) thereof. The microporous mould part (4, 5) or the microporous section (6) thereof is pre-heated by supply of warm fluid, such as a heated gas. Said part (4, 5) or section (6) is after terminated moulding cooled by supply of cold fluid, such as a condensed gas. the invention includes in a further aspect a moulded body produced according to the process.

35 Claims, 3 Drawing Sheets

PROCESS INCLUDING HEATING AND COOLING FOR PRODUCTION OF AN INJECTION-MOULDED BODY

BACKGROUND OF THE INVENTION

The present invention relates to a process for production of a moulded ceramic and/or metallic body. The basic material is a ductile material comprising one or more ceramic and/or metallic components, such as particles, which are mixed or coated with at least one binder and fed into a pre-heated mould cavity of a moulding tool. The mould cavity of said moulding tool is enveloped by at least two mould parts of which at least one wholly or partly consists of a microporous material with communicating pores, which mould part is pre-heated by supply of warm fluid and after terminated moulding cooled by supply of cold fluid. The invention include in a further aspect a moulded body made according to the procedure.

It has for a long time been known to manufacture moulded bodies using various moulding procedures, such as injection moulding, extrusion, blow moulding or casting. The basic material is usually a ductile material consisting of ceramic or metallic powders or particles and one or more binders, additives and the like. A common procedure in making ceramic or metallic moulded bodies often comprises three steps. The first step is the moulding, whereby the ductile material is shaped in the mould of a moulding tool. A second step implies evaporation of binders, additives etc. included in the ductile material. The procedure is terminated by a particle compression, such as a sintering.

The procedure as above typically starts with a mixing or coating of the ceramic or metallic powder or particles with a binder system comprising for example at least one polymer, such as thermosets and thermoplastics, and one or more additives having lubricating properties, such as waxes and stearates. The binder system can suitably be liquid per se or be in a liquid state, such as a solution or a fuse. The mixture is heated, typically≈150° C., to a consistency allowing injection and is thereafter fed, for instance by means of an extruder, into the mould part or parts, normally a mould cavity, of a moulding tool, wherein the binder physically, chemically or thermally is transformed into a solid state, and a moulded body consisting of for instance particles bonded together by the binder is obtained. The moulded body is cooled and released from the moulding tool. Binders and additives included in said moulded body are removed by suitable methods, such as heating, freeze drying or vaporisation, whereby a moulded body substantially bonded by particle bodying is obtained. The binder content is here normally less than 5%. Obtained moulded body can now be sintered using various sintering procedures, including among others dense sintering, liquid phase sintering, solid phase sintering, exogas and endogas sintering, reaction sintering, pressure sintering, vacuum sintering, selected laser sintering, microwave sintering and activated sintering. The three hereby disclosed steps can be performed directly after each other in a linked manufacturing unit or be performed at different occasions and in separate units, whereby each of the various stages of the moulded body can be further treated and/or worked.

It has also for a long time been known to pre-heat a moulding tool at production of metallic and ceramic moulded bodies. Such a pre-heating is normally obtained by heated oil or water circulating in a pipe system. Pre-heating can also be performed by means of for example an electric rod or other electro-heating. It is furthermore known to cool a moulded body after terminated moulding by means of cold water. Microporous mould parts having microporous mould surfaces, which mould parts can be heated and/or cooled through communicating pores have for some time been used in connection with moulding of thermosets and thermoplastics.

Cyclic temperature regulation, of a moulding tool, alternating between a cold state, a heated state and back to a cold state and so on, are demanding reasonable cycle times not possible using said oil and water systems. The problem is known from the manufacturing of thermosets and rubbers, both requiring heated moulds for respective reaction and curing mechanism during the moulding. Regulation in such intervals of the temperature in a metallic or ceramic moulded body with reasonable heating and cooling times is due to conductive heat transport very difficult and has so far been a bar to maximised and rational utilisation of moulding tools. A heated mixture of ceramic or metallic particles, binders, additives etc. is when fed into a cold, a comparatively cold or an unevenly heated mould partly cooled and a skin formed on its surface facing the mould. This gives rise to a complexity of undesired side effects, such as inner tension due to differences between surface and core temperature, corrugation due to shear strain changes, uneven particle distribution in the moulded body due to particle piling in parts having reduced temperature. Corrugation can, furthermore, primarily or secondarily cause for instance defects in the surface finish and/or imply difficulties in the production a moulded body of complex geometry. Inner tensions and uneven particle distribution result in moulded bodies and articles having an uneven and/or inferior quality.

The demand for a more even heating of the mould surface(s) of a moulding tool and a more rapid as well as facilitated cycling between heated and cooled state, which means between pre-heating of for example the mould part(s) and/or surface(s) and cooling of the moulded body, is very pronounced.

SUMMARY OF THE INVENTION

The process according to the present invention quite unexpectedly makes it possible to obtain a rapid and simple cycling between heating and cooling of the mould cavity of a moulding tool. Pre-heating of the mould cavity is furthermore, very evenly distributed, whereby said undesired effects, such as differences in surface and core temperature, corrugation and uneven particle distribution are eliminated or substantially reduced. The process according to the present invention reduces the cycle. time in the production of ceramic and/or metallic moulded bodies. The even temperature distribution, makes it possible to produce a moulded body having a complex geometry and an increased surface finish from a ductile material having a decreased amount of binder(s), additive(s) and the like, whereby evaporation thereof furthermore is facilitated.

The process according to the present invention relates to production of a moulded ceramic and/or metallic body. The moulded body is produced by means of a moulding procedure, such as an injection moulding, a blow moulding, a gas injection moulding, an extrusion or a casting, from a ductile material comprising one or more ceramic and/or metallic components in form of a powder or particles, which components have been mixed or coated with at least one binder and optionally at least one property adjusting additive, such as waxes and stearates. The process comprises one or more steps. The ductile material is in a first step (a) moulded by being fed into one or more, preferably 1–160, such as 1, 2, 4, 8, 16, 32, 64 or 96, mould cavities in a moulding tool, said cavities comprising one or more mould surfaces and being enveloped by at least two mould parts, of which at least one mould part wholly or partly consists of a microporous sintered material with communicating pores. The microporous mould part is provided with at least one means for supply of warm and/or cold fluid. The wholly or partly microporous mould part comprises, in at least one microporous section, one or more mould surfaces exhibiting substantially closed pores. The wholly or partly microporous mould part is, furthermore, provided with at least one outer surface, which wholly or partly exhibits substantially open pores and/or is provided with at least one outlet for evacuation of supplied fluid. At least one mould surface of at least mould cavity, which cavity is a part of a wholly or partly microporous mould part, is before feeding of ductile material and, optionally, at least initially during the subsequent process, heated by supply of warm fluid. Said surface is, after said feeding of ductile material, cooled in the closed moulding tool by supply of cold fluid to the micropores. Particles, binders and optional additives are, through heating by means of supplied warm fluid, bonded to a moulded body, whereby at least one in the ductile material included binder from a liquid or an intermediate liquid state physically, chemically and/or thermally is transformed into a solid state. The mould parts can, in various embodiments, each and independently be heated by means of warm fluid and/or electrically.

The first step (a) can optionally be followed by a second step (b), whereby in the moulded body included binder(s) and/or additive(s) wholly or partly are removed by heating; freeze drying; solvent leaching, soaking or maceration; evaporation under vacuum and/or heat; catalysed evaporation; or the like. A substantially by physical properties, such as particle bodying, bonded moulded body is thus obtained. The temperature during heat induced evaporation is normally within 100–500° C., such as 200–300° C. or preferably 200–300° C., whereby the metallic and/or ceramic particles are pre-sintered.

The moulded body obtained according to step (a) or (b) is during an optional third step (c) sintered, whereby particle compression produces a sintered moulded body. Said sintering in said step (c) is preferably a dense sintering, a liquid phase sintering, a solid phase sintering, an exogas or an endogas sintering, a reaction sintering, a pressure sintering, a vacuum sintering, a selected laser sintering, a microwave sintering or an activated sintering. A suitable sintering temperature is normally within 500–3000° C., such as 600–2500° C. or preferably 800–2000° C. Sintering is a procedure wherein a material in form of particles during heating or furnacing under atmospheric pressure, overpressure or vacuum with or without protective gas is compressed, whereby interparticle bonds are formed and the particles are transformed into a solid mass. Available and common sintering atmospheres are endotherm and exotherm gases (endo and exogases). Endo and exogases are normally produced by allowing a hydrocarbon catalyst to react at an elevated temperature with a pre-determined amount of air, whereby mainly $H_2$, $N_2$, CO and minor amounts of $CO_2$, $CH_2$ and $H_2O$ are formed. Production of endogases requires compared to exogases a higher amount of air in relation to hydrocarbon.

Common and in metallic and/or ceramic moulded bodies and hence in above disclosed ductile material used metals and/or ceramics are for instance iron, cobalt, tungsten, molybdenum, vanadium, bismuth, niobium, tin, titanium, nickel, tantalum, zirconium, aluminium, alloys and mixtures thereof and therewith, calcite, kaolin, alum, China clay, quarzite, chromite, magnesite, magnetite, silicon dioxide, silicon carbide, silicon nitride, boron carbide, boron nitride and/or mixtures thereof and therewith. These compounds are also commonly used in combinations with carbon and/or graphite. Metals can, furthermore, be used as oxides, carbides, nitrides and similar compounds. Mixtures of various metals, metal alloys and/or ceramics are advantageously used for various speciality application and to provide a moulded body or an article produced therefrom with specific and/or specified properties.

The present invention provides an excellent and even pre-heating as well as heating of the mould surface or surfaces of a moulding tool, implying that the ductile material advantageously, in stead of or in combination with polymers such as thermosets and thermoplastics, can comprise ceramic and metallic binding materials including bentonite, silicates of soda, low temperature melting metals or metal alloys, such as Woods metal, Roses metal and alloys of copper, lead, tin and zinc. The low temperature melting metal or metal alloy has preferably a melting point of at most 150° C. Above type of ceramic and metallic binders can, where possible or suitable, be present as a powder or as particles. The ductile material typically comprises 30–99, preferably 60–90, per cent by volume of metal and/or ceramic particles having a particle size of less than 300 pm, such as 1–10 $\mu$m or 100–200 $\mu$m, while the binder content is 1–70, preferably 10–40, per cent by volume.

In various embodiments of the present invention are at least the mould surface or surfaces, arranged in a wholly or partly microporous mould part, prior to feeding of ductile material to the mould cavity or cavities, and optionally during some part of the subsequent process, heated to a temperature of 50–300° C., preferably 90–250° C., by supply of warm fluid. The warm fluid is supplied through one or more capillary tubes or channels or through at least one gap, slit or channel arranged between a microporous section and a substantially solid section of said mould part. Said mould surface can alternatively be heated to said temperatures by supply of warm fluid directly into the cavity through a slit, channel or gap between two mould parts, through capillary tubes or through the gate of the moulding tool. The warm fluid is in preferred embodiments a heated gas, such as air, air mixtures; carbon dioxide; nitrogen; hydrogen; an inert gas, for instance helium or argon; and/or mixtures thereof and therewith. The warm fluid can also be heated water or oil, such as a mineral oil, a triglyceride or an equivalent fatty acid ester. Further suitable heating methods include electro-heating and the like. The choice of heating method is among other reasons influenced by the geometry of produced moulded body and used moulding tool and procedure. After feeding of ductile material into the closed moulding tool, are at least the mould surface or surfaces arranged in a wholly or partly microporous mould part cooled, preferably at least 20° C. in relation to its temperature as heated, by supply of cold fluid to the micropores of said mould part. The cold fluid is supplied through one or more capillary tubes or channels or through at least one slit, channel or gap arranged between a microporous section and a substantially solid section of said mould part. The cold fluid is preferably a condensed gas, such as carbon dioxide, nitrogen or air. Cooling is a results of condensed gas expanding inside the micropores of the mould part. Supplied warm or cold gas is suitably evacuated by means of one or more capillary tubes or slits or by means of diffusion via the open micropores of the wholly or partly microporous mould part.

Warm and cold gaseous fluid is suitably supplied in cycles at a pressure of 2 to 70, preferably 5 to 60, bars, whereby cold fluid is forced out by warm fluid and warm fluid by cold fluid. Supply and evacuation can be made jointly or separately by means of for instance capillary tubes, channels and/or slits with or without one or more networks of guiding valves. The herein disclosed method of heating and/or cooling of one or more mould surfaces utilises conductive as well as convective heat flow increased by the large flow areas provided by micropores. This makes a rapid cycling between a warm and a cold state possible and provides an improved and more even heating and cooling, whereby previously discussed advantages are obtained and previously disclosed problems are avoided.

The wholly or partly microporous mould part is preferably made of a microporous sintered metal produced from steel particles or powder, such as iron based carbon steel, stainless steel and high-tech steel alloys, preferably containing titanium, nickel, chromium, tungsten and/or molybdenum. The closed micropores of a mould surface are suitably obtained mechanically, by heat treatment or by surfacing a 2 $\mu$m to 2 $\mu$m, preferably 2 to 500 $\mu$m, layer of titanium, nickel, chromium, titanium carbide, titanium nitride and/or aluminium trioxide. A surfacing is preferably a vacuum surfacing, such as a chemical or physical gas surfacing including evaporation, deposition, ion plating and sputtering, such as reactive magnetron sputtering. Chemical gas surfacing means that said layer is formed by deposition of chemical reaction products resulting from a high temperature process. The temperature is normally 800–1300° C. Physical gas surfacing can generally be divided into the three main groups evaporation, sputtering and ion plating. A physical gas surfacing is characterised in that a solid substance (a starting material) is transformed to a layer on an object according to following general procedure: Solid phase→evaporation/sputtering→gaseous phase→condensation→solid phase. The composition of the surfaced layer need not be the same as that of the starting material. The evaporated starting material can be allowed to react with for instance a reactive gas. Transformation of the starting material into gaseous state can be done by resistance heating or by means of an electron gun. Evaporation can also be performed by so called sputtering, meaning that atoms are ejaculated by means of bombarding argon ions.

A moulding tool having at least one wholly or partly microporous mould part comprising at least one mould surface exhibiting closed pores is used in preferred embodiments of the process. Nothing prevents, however, where applicable, suitable and/or in order to obtain a maximised heating and/or cooling, the use of a moulding tool wherein all parts or, preferably, all in the moulding process participating parts are porous or microporous. The mould surface or surfaces can in certain embodiments exhibit open pores. The outer surface of a microporous section included in a mould part can according to one embodiment of the process exhibit a sealed or tightened surface with closed pores, whereby supplied warm or cold fluid is evacuated via one or more outlets arranged therein. Suitable outlets are for instance capillary tubes or the like, preferably being tightened towards said outer surface.

In a further aspect, the invention refers to a moulded body produced by the process of the present invention. The moulded body comprises one or more metallic and/or ceramic components and is produced by moulding a ductile material comprising one or more ceramic and/or metallic powders or particles, preferably having a particle size of 1–300 $\mu$m, such as 1–10 $\mu$pm or 100–200 $\mu$m. The particles have been mixed or coated with at least one binder and optionally at least one property adjusting additive, whereby the metallic and/or ceramic content is 30–99, preferably 60–90, per cent by volume while the binder content is 1–70, preferably 10–40, per cent by volume. The moulding is performed according to previously disclosed step (a) of the process. The content of binder and additive can optionally, as disclosed in step (b) of the process, be removed and the from step (a) or (b) resulting moulded body can optionally and in accordance with step (c) of the process be sintered.

A sintered moulded body produced according to the process of the present invention can in its various embodiments advantageously be used in a large number of industrial application areas, including machinery and parts thereto, such as gear, cog, paddle, blade and turbine wheels as well as shafts thereto.

Further application areas are for instance drilling, milling, lathery and grinding tools and tooling. Suitable application areas are also permanent magnets and filaments.

BRIEF DESCRIPTION OF THE DRAWINGS

These and other objects and the attendant advantages will be more fully understood from the following detailed description, taken in conjunction with appended Figures and Example, wherein like reference numerals have been applied to like parts throughout the various Figures and wherein.

The various parts of FIGS. 1–3 are not entirely according to scale. Some parts are, to facilitate reading, enlarged or reduced. The moulding tools of FIGS. 1–3 are used in various embodiments of step (a) of the process of the present invention.

DETAILED DESCRIPTION OF THE PREFERRED EMBODIMENTS

Figure 1:
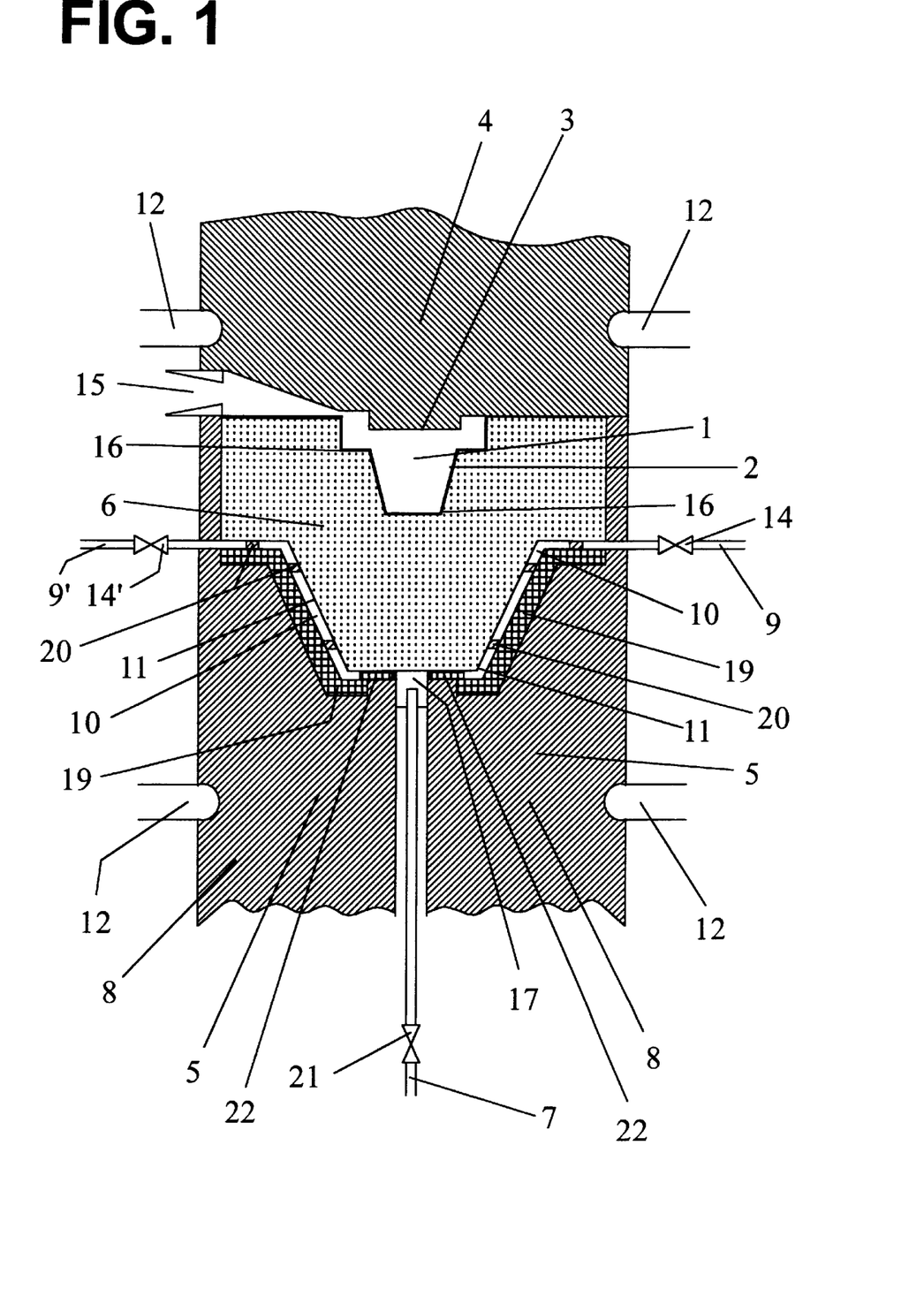
FIG. 1: Shows a partial skeleton drawing of two mould parts, of which one has a microporous section included in a moulding tool. Warm fluid is supplied and evacuated by means of a channel between the microporous and a substantially solid section of said mould part and cold fluid is supplied through a capillary tube and evacuated through said channel.

FIG. 1 shows a skeleton drawing of two mould parts 4, 5 being included in a moulding tool. One mould part 4 is entirely solid (steel) and one mould part 5 comprises a solid (steel) section 8 and a microporous (sintered steel) section 6. The microporous section 6 is an insert in the solid section 8. The insert is supported by steel bosses 20 and rests on two ceramic beds 22. A channel 10 between the solid section 8 and the microporous section 6 encircles said microporous section 6. Warm fluid for heating is supplied to the channel 10 and thus the microporous section 6 via a capillary tube 9 provided with a valve 14 and evacuated on the opposite side of the channel 10 through a capillary tube 9' provided with a valve 14'. The valve 14' is during supply of warm fluid preferably shut. Supplied warm fluid is distributed inside the microporous section 6 by penetrating its outer surface 11, which surface 11 exhibits open pores. Supplied warm fluid is removed by means of diffusion or is forced out of the pores of section 6 by a supply of cold fluid. Between the microporous section 6 and the solid section 8, embedding the channel 10, is furthermore an insulating ceramic layer 19. The microporous section 6 comprises a mould cavity I having a mould surface 2 exhibiting closed pores. The closed pores have been obtained by a surfaced 10 pm nickel layer 16. The mould part 4 has a mould surface 3, without any surfaced, coated or otherwise applied layer. Cold fluid for cooling is supplied to the micropores of section 6 via a capillary tube 7 provided with a valve 14", which capillary tube 7 ends in an expansion cavity 17 beneath the outer surface 11 of the microporous section 6. The valves 14, 14' can during supply of cold fluid independently be open or shut. The cold fluid expands in the expansion cavity 17, whereby providing a strong cooling effect. Said cold fluid penetrates into and is distributed inside the micropores of section 6. Cold fluid can be removed by means of diffusion or be forced out of the micropores by supply of warm fluid and is evacuated through the channel 10 and the thereto attached capillary tubes 9 and/or 9'. Heating and cooling can, due to the fact that the capillary tubes 7, 9, 9' each is provided with a valve 21, 14, 14', be controlled according to requirement by adjustment of supplied and/or evacuated amount of warm and/or cold fluid. The solid section 8 and the mould part 4 are, furthermore, electrically heated by heating devices 12. A ductile material to be moulded is fed into the cavity I via a gate 15. The gate 15 can also, if so is desired and/or suitable, be used for heating of the cavity 1. Warm fluid is then, prior to feeding of the ductile material, supplied directly into the cavity I through the gate 15 by means of one or more tubes, channels, hoses or other suitable piping.

Figure 2:
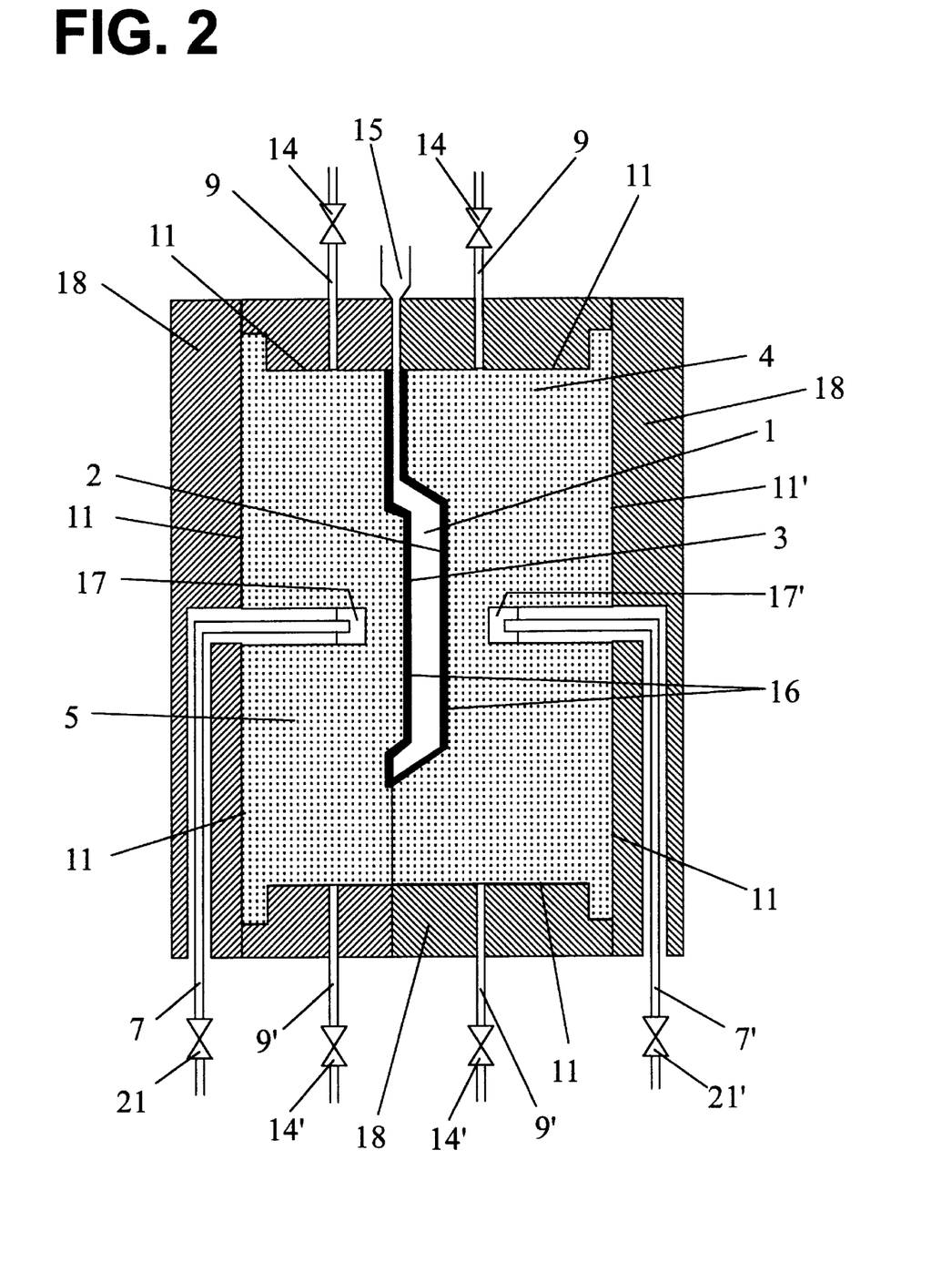
FIG. 2: Shows a partial skeleton drawing of two moulding parts included in a moulding tool, each mould part comprises a microporous section. Cold and warm fluid are supplied and evacuated through capillary tubes.

FIG. 2 shows a skeleton view of two mould parts 4, 5 being included in a moulding tool. The mould parts 4, 5 are both completely microporous (sintered steel) and enveloped by a solid steel frame 18. Warm fluid for heating is supplied to respective micropores of said mould parts 4, 5 through capillary tubes 9 each provided with a valve 14 and evacuated on the opposite side through capillary tubes 9' each provided with a valve 14'. The valves 14' is during supply of warm fluid preferably shut. Supplied warm fluid is distributed inside the mould parts 4, 5 by penetrating respective outer surface 11, 11', which surfaces 11, 11' exhibit open micropores. Supplied warm fluid is removed by means of diffusion or is forced out of the micropores by supply of cold fluid and is evacuated through said capillary tubes 9'. The mould parts 4, 5 comprise a mould cavity 1, having mould surfaces 2, 3 exhibiting closed pores. The closed pores are obtained by a surfaced 50 $\mu$m layer 16 of aluminium trioxide. Cold fluid for cooling is supplied to the micropores of respective mould part 4, 5 through capillary tubes 7, 7', each provided with a valve 21 and 21' and each ending in an expansion cavity 17 and 17'. The cold fluid expands in the expansion cavities 17 and 17', whereby providing a strong cooling effect. Said cold fluid penetrates into and is distributed inside the pores of respective mould parts 4 and 5. Cold fluid can be removed by means of diffusion or be forced out of the pores by supply of warm fluid and is evacuated through the capillary tubes 9 and/or 9'. Heating and cooling can, due to the fact that the capillary tubes 7, 7' 9, 9', each is provided with a valve 21, 21' 14, 14', be controlled according to requirement by adjustment of supplied and/or evacuated amount of warm and/or cold fluid. A ductile material to be moulded is fed into the cavity 1 via a gate 15. The gate 15 can also, if so is desired and/or suitable, be used for heating of the cavity 1. Warm fluid is then, prior to feeding of the ductile material, supplied directly into the cavity I through the gate 15 by means of one or more tubes, channels, hoses or other suitable piping.

Figure 3:
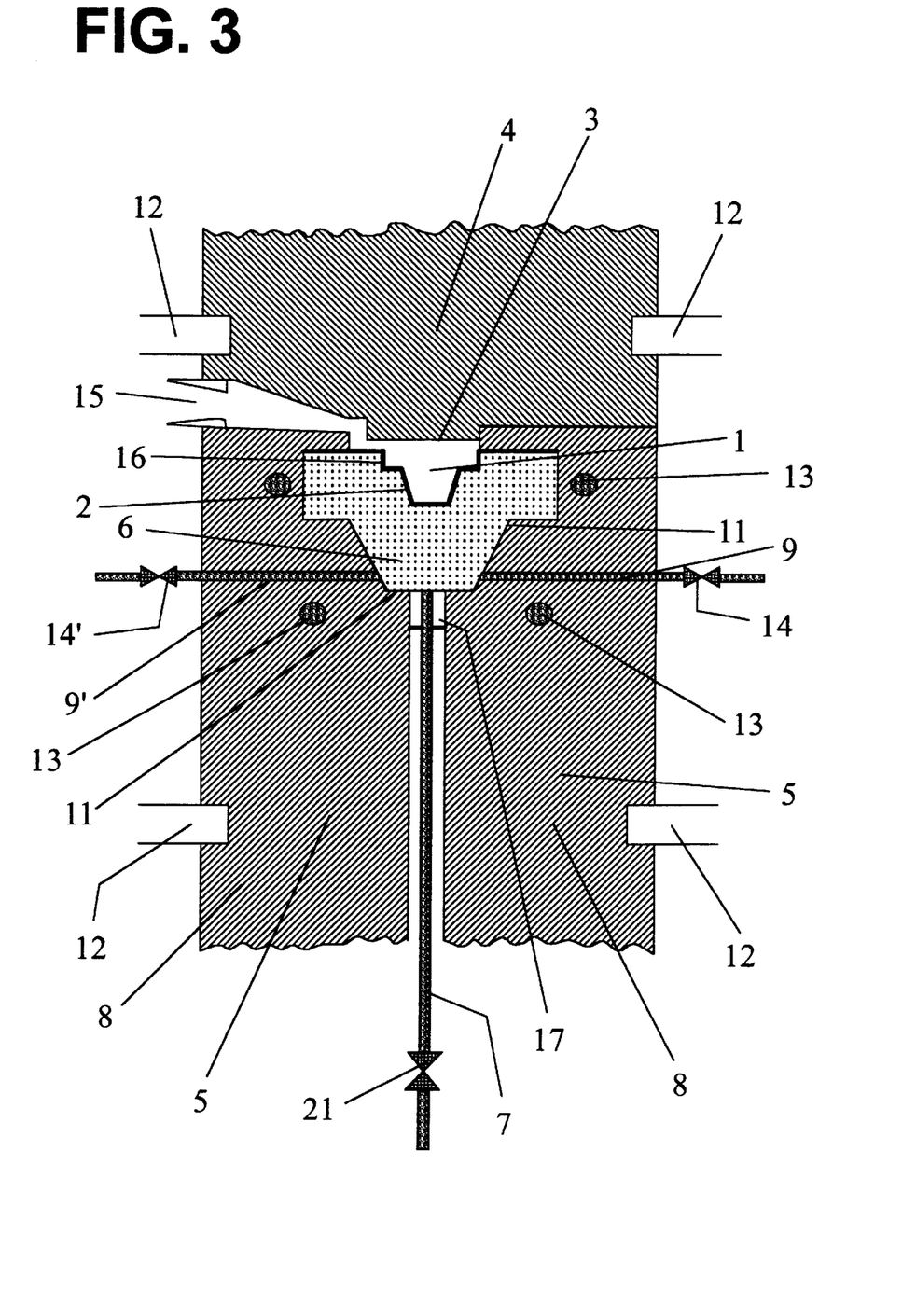
FIG. 3: Shows a partial skeleton drawing of two mould parts, of which one has a microporous section, included in a moulding tool. Warm and cold fluid is supplied and evacuated through capillary tubes.

FIG. 3 shows a skeleton view of two mould parts 4, 5 being included in a moulding tool. One mould part 4 is entirely solid (steel) and one mould part 5 comprises a solid (steel) section 8 and a microporous (sintered steel) section 6. The microporous section 6 is an insert in the solid section 8. Warm fluid for heating is supplied to the microporous section 6 through a capillary tube 9 provided with a valve 14 and evacuated on the opposite side of the microporous section 6 through a capillary tube 9' provided with a valve 14'. The valve 14' is during supply of warm fluid preferably shut. Supplied warm fluid is distributed inside the microporous section 6 by penetrating its outer surface 11, which surface 11 exhibits open micropores. Supplied warm fluid is removed by means of diffusion or is forced out of the micropores of section 6 by supply of cold fluid. The microporous section 6 comprises a mould cavity I having a mould surface 2 exhibiting closed pores. The closed pores have been obtained by a surfaced 25 $\mu$m nickel layer 16. The mould part 4 has a mould surface 3, without any surfaced, coated or otherwise applied layer. Cold fluid for cooling is supplied to the micropores of section 6 via a capillary tube 7 provided with a valve 21, which capillary tube 7 ends in an expansion cavity 17 beneath the outer surface 11 of the microporous section 6. The valves 14 and 14' can during supply of cold fluid independently be open or shut. The cold fluid expands in the expansion cavity 17, whereby providing a strong cooling effect. Said cold fluid penetrates into and is distributed inside the micropores of section 6 and can be removed by means of diffusion or be forced out of the micropores by supply of warm fluid. Cold fluid is evacuated through the capillary tube 9 and/or 9'. Heating and cooling can, due to the fact that the capillary tubes 7, 9, 9' each is provided with a valve 21, 14 and 14' be controlled according to requirement by adjustment of supplied and/or evacuated amount of warm and/or cold fluid. The mould part 4 are, furthermore, water cooled, whereby the water is supplied through water inlets 23. The solid section 8 of the mould part 5 is also water cooled through water inlets 23 and in addition thereto internally arranged water channels 13. A ductile material to be moulded is fed into the cavity I via a gate 15. The gate 15 can also, if so is desired and/or suitable, be used for heating of the cavity 1. Warm fluid is then, prior to feeding of the ductile material, supplied directly into the cavity 1 through the gate 15 by means of one or more tubes, channels, hoses or other suitable piping.

EXAMPLE

A moulding tool, similar to that disclosed in FIG. 1, comprising two mould parts 4, 5 was used One mould part 4 was entirely solid (steel) and one mould part 5 consisted of a solid section 8 and a microporous section 6, which section 6 comprised a mould cavity I having a mould surface 2 exhibiting closed micropores in accordance with FIG. 1 and an outer surface 11 exhibiting open micropores. The microporous section 6 was an insert in the solid section 8. The moulding tool was provided with means 7, 9, 9' and 10 for supply and evacuation of cold and warm fluid.

The moulding tool was closed and warm carbon dioxide, 160° C., was supplied to the microporous section 6 through a capillary tube 9' and a channel 10 arranged between said microporous section 6 and said solid section 8 of mould part 5. The warm carbon dioxide was immediately distributed in the micropores of section 6, whereby a strong heating was obtained. The temperature in section 6 was rapidly raised to 100–110° C. A ductile material was now injected through a gate 15 into the mould cavity 1. Said ductile material consisted of particles of tungsten carbide homogeneously suspended in molten polyethylene with an addition of lubricating wax. Cold fluid, condensed carbon dioxide, was after terminated injection supplied to the micropores through a from below towards the outer surface 11 of section 6 directed capillary tube 7. The capillary tube 7 ended a small distance beneath the outer surface 11 in an expansion cavity 17. The cold carbon dioxide expanded in said expansion cavity 17 and a strong cooling effect was obtained. The moulding tool was, when the temperature had decreased 100° C. and the binder had obtained a solid state, opened and the thus resulting moulded body was ejected. Heating by supply of warm carbon dioxide was immediately re-commenced and the moulding process repeated.

Cooling and heating was controlled by a thermoelement arranged inside the mould cavity I and the amount of supplied warm and cold carbon dioxide was adjusted by a supervising unit arranged outside the moulding tool. The supervising unit co-operated with the thermoelement and a number of valves 14, 14', 21.

The cycle time of above injection moulding was 8–10 seconds.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

I claim:

1. A process for production of a molded body, comprising the steps of:
   a) providing a ductile material comprising a binder and particles selected from the group consisting of ceramic particles, metallic particles, and mixtures thereof;
   b) providing a molding tool having a mold cavity (1) defined by at least two mold parts (4, 5), wherein at least one mold part (4, 5) is at least partially made of a microporous sintered material having at least one set of communicating micropores, and wherein said microporous mold part (4, 5) is provided with at least one means (7, 7', 9, 9') for supply of fluid; and wherein:
      i) the microporous mold part (4, 5) comprises at least one mold surface (2, 3) having substantially closed micropores; and
      ii) the microporous mold part (4, 5) comprises at least one outer surface (11), said outer surface (11) being substantially provided with open micropores for evacuation of supplied fluid;
   c) heating the microporous mold part (4, 5) by supply of warm fluid;
   d) feeding the ductile material into the mold cavity after the microporous mold part has been heated; and
   e) cooling the microporous mold part (4, 5) after feeding the ductile material into the mold cavity (1) by supplying cold fluid to the micropores of said microporous mold part (4, 5); whereby the particles and the binder are bonded to form a molded body when the binder is transformed into a solid state;
   f) at least partially removing the binder from the molded body of step e) by a process selected from the group consisting of heating, freeze drying, solvent leaching, solvent soaking, solvent maceration, heat evaporation, vacuum evaporation, and catalyzed evaporation; and
   g) sintering the molded body formed in step f), thereby resulting in a molded body substantially bonded by particle compression.

2. A process according to claim 1 wherein each mold part (4, 5) is independently heated by one of warm fluid, electrical heating devices, and combinations thereof.

3. A process according to claim 1 wherein the molding tool comprises between about 1–160 mold cavities (1).

4. A process according to claim 1, wherein the microporous mold part (4, 5) is heated by supply of warm fluid to the micropores of said microporous mold part (4, 5).

5. A process according to claim 4 wherein warm fluid is supplied through one or more capillary tubes (9, 9').

6. A process according to claim 4 wherein warm fluid is supplied through at least one channel (10) arranged between a microporous section (6) and a substantially solid section (8) of the mold part (4, 5).

7. A process according to claim 1 wherein the microporous mold part (4, 5) is heated by feeding warm fluid into the mold cavity (1).

8. A process according to claim 7 wherein the warm fluid is fed through a gate between the two mold parts (4, 5).

9. A process according to claim 1, wherein the warm fluid is a heated gas.

10. A process according to claim 9 wherein the heated gas is selected from the group consisting of helium, argon, and mixtures thereof.

11. A process according to claim 1, wherein the warm fluid is selected from the group consisting of water, mineral oils, triglycerides, and fatty acid esters.

12. A process according to claim 1, wherein supplied warm fluid is evacuated through a capillary tube (9, 9') and a channel (10).

13. A process according to claim 1, wherein the microporous mold part (4, 5) is heated to a temperature of between about 50–300° C. before the ductile material is fed into the mold cavity.

14. A process according to claim 1, wherein cold fluid is supplied through one or more capillary tubes (7, 7').

15. A process according to claim 1, wherein cold fluid is supplied to the micropores through at least one channel (10) arranged between a microporous section (6) and a substantially solid section (8) of the mold part (4, 5).

16. A process according to claim 1, wherein the cold fluid is a condensed gas selected from the group consisting of carbon dioxide, nitrogen, air, and mixtures thereof.

17. A process according to claim 1, wherein supplied cold fluid is evacuated through one or more capillary tubes (9, 9') and a channel.

18. A process according to claim 1, wherein after the ductile material is fed into the mold cavity, the microporous mold part (4, 5) is cooled at least 20° C. from the heating temperature.

19. A process according to claim 1, wherein warm and cold fluid are supplied and evacuated in cycles through at least one capillary tube and a channel.

20. A process according to claim 19 wherein warm fluid is forced out of the micropores by a supply of cold fluid and cold fluid likewise is forced out of the micropores by a supply of warm fluid.

21. A process according to claim 1, wherein warm and cold fluid are supplied at a pressure of between about 2–70 bars.

22. A process according to claim 1, wherein the microporous sintered material is a microporous sintered metal made from steel particles an alloy selected from the group consisting of iron based carbon steel, stainless steel, and steel alloys.

23. A process according to claim 22, wherein the sintered metal contains metal selected from the group consisting of titanium, nickel, tungsten, chromium, molybdenum, and mixtures thereof.

24. A process according to claim 1, wherein the closed micropores of the mold surface are obtained by surfacing.

25. A process according to claim 24 wherein the surfacing is a vacuum surfacing.

26. A process according to claim 24 wherein the surfacing is a gas surfacing selected from the group consisting of evaporation, deposition, ion plating, and sputtering.

27. A process according to claim 26 wherein the sputtering is a reactive magnetron sputtering.

28. A process according to claim 24, wherein the surfacing deposits a material selected from the group consisting of titanium, nickel, chromium, titanium carbide, titanium, nitride aluminium trioxide, and mixtures thereof.

29. A process according to claim 24, wherein the surfacing has a thickness of between about 2 $\mu$m to 2 cm.

30. A process according to claim 24, wherein the molding procedure is a procedure selected from the group consisting of injection molding, blow molding, gas injection molding, extrusion, and casting.

31. A process according to claim 1, wherein step f) is performed at a temperature of 150–400° C.

32. A process according to claim 1, wherein step g) is performed at a temperature of between about 600–2500° C.

33. A process according to claim 32 wherein step g) is a sintering selected from the group consisting of a dense sintering, a liquid phase sintering, a solid phase sintering, an exogas sintering, an endogas sintering, a reaction sintering, a pressure sintering, a vacuum sintering, a selected laser sintering, a microwave sintering, and an activated sintering.

34. A process for production of a molded body, comprising the steps of:
 a) providing a ductile material comprising a binder and particles selected from the group consisting of ceramic particles, metallic particles, and mixtures thereof;
 b) providing a molding tool having a mold cavity (1) defined by at least two mold parts (4, 5), wherein at least one mold part (4, 5) is at least partially made of a microporous sintered material having at least one set of communicating micropores, and wherein said microporous mold part (4, 5) is provided with at least one means (7, 7', 9, 9') for supply of fluid; and wherein;
  i) the microporous mold part (4, 5) comprises at least one mold surface (2, 3) having substantially closed micropores; and
  ii) the microporous mold part (4, 5) comprises at least one outer surface (11), said outer surface (11) being substantially provided with open micropores for evacuation of supplied fluid;
 c) heating the microporous mold part (4, 5) by supply of warm fluid;
 d) feeding the ductile material into the mold cavity after the microporous mold part has been heated; and
 e) cooling the microporous mold part (4, 5) after feeding the ductile material into the mold cavity (1) by supplying cold fluid to the micropores of said microporous mold part (4, 5); whereby the particles and the binder are bonded to form a molded body when the binder is transformed into a solid state; and
 f) sintering the molded body formed in step e), thereby resulting in a molded body substantially bonded by particle compression.

35. A process according to claim 34 wherein step f) is a sintering selected from the group consisting of a dense sintering, a liquid phase sintering, a solid phase sintering, an exogas sintering, an endogas sintering, a reaction sintering, a pressure sintering, a vacuum sintering, a selected laser sintering, a microwave sintering, and an activated sintering.

* * * * *

UNITED STATES PATENT AND TRADEMARK OFFICE
CERTIFICATE OF CORRECTION

PATENT NO. : 5,989,492
DATED : November 23, 1999
INVENTOR(S) : Larsson

It is certified that error appears in the above-indentified patent and that said Letters Patent is hereby corrected as shown below:

Column 5, Line 22, delete "$2\mu m$ to $2\mu m$" and insert --$2\mu m$ to 2 cm--.

Column 7, Line 8, delete "pm" and insert -- m--.

Column 7, Line 29, delete "I" and insert --1--.

Column 7, Line 32, delete "I" and insert --1--.

Column 8, Line 3, delete "I" and insert --1--.

Column 8, Line 20, delete "I" and insert --1--.

Column 8, Line 44, delete "I" and insert --1--.

Column 8, Line 56, delete "I" and insert --1--.

Column 9, Line 19, delete "I" and insert --1--.

Signed and Sealed this

Nineteenth Day of December, 2000

Attest:

Q. TODD DICKINSON

Attesting Officer

Commissioner of Patents and Trademarks